United States Patent
Ito et al.

(10) Patent No.: US 11,327,605 B1
(45) Date of Patent: May 10, 2022

(54) REDUCING INTERFERENCE WITHIN A DISPLAY PANEL WHILE PERFORMING INPUT SENSING

(71) Applicant: SYNAPTICS INCORPORATED, San Jose, CA (US)

(72) Inventors: Daisuke Ito, Tokyo (JP); Hiroshi Takeyama, Tokyo (JP); Jonathan Losh, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/142,648

(22) Filed: Jan. 6, 2021

(51) Int. Cl.
*G06F 3/041* (2006.01)
*G06F 3/044* (2006.01)

(52) U.S. Cl.
CPC .......... *G06F 3/04184* (2019.05); *G06F 3/044* (2013.01); *G06F 2203/04107* (2013.01)

(58) Field of Classification Search
None
See application file for complete search history.

(56) References Cited

U.S. PATENT DOCUMENTS

2015/0378467 A1\* 12/2015 Hoch .................... G06F 3/0443
    345/174
2020/0401267 A1\* 12/2020 Hosaka ................ G06F 3/0418

\* cited by examiner

*Primary Examiner* — Stephen T. Reed
(74) *Attorney, Agent, or Firm* — Leydig, Voit & Mayer, Ltd.

(57) ABSTRACT

A processing system for an input device comprises sensor circuitry. The sensor circuitry is configured to operate sensor electrodes for input sensing during a first sensing frame. During a first period of the first sensing frame the sensor circuitry is configured to drive a first portion of the sensor electrodes with a sensing signal, drive a second portion of the sensor electrodes with a guarding signal, and drive a third portion of the sensor electrodes with a reference signal. The guarding signal and the sensing signal have at least one characteristic in common selected from the group consisting of amplitude, phase and frequency. The third portion of the sensor electrodes overlaps a first gate line of a display panel selected for updating during the first period.

20 Claims, 14 Drawing Sheets

| ROW | FIRST PERIOD | SECOND PERIOD | THIRD PERIOD |
|---|---|---|---|
| 170 | REFERENCE SIGNAL | GUARDING SIGNAL OR REFERENCE SIGNAL | GUARDING SIGNAL OR REFERENCE SIGNAL |
| 171 | GUARDING SIGNAL OR REFERENCE SIGNAL | GUARDING SIGNAL OR REFERENCE SIGNAL | GUARDING SIGNAL OR REFERENCE SIGNAL |
| 172 | GUARDING SIGNAL OR REFERENCE SIGNAL | GUARDING SIGNAL OR REFERENCE SIGNAL | GUARDING SIGNAL |
| 173 | GUARDING SIGNAL OR REFERENCE SIGNAL | REFERENCE SIGNAL | SENSING SIGNAL |
| 174 | GUARDING SIGNAL | GUARDING SIGNAL OR REFERENCE SIGNAL | GUARDING SIGNAL |
| 175 | SENSING SIGNAL | GUARDING SIGNAL | REFERENCE SIGNAL |
| 176 | GUARDING SIGNAL | SENSING SIGNAL | GUARDING SIGNAL OR REFERENCE SIGNAL |
| 177 | GUARDING SIGNAL OR REFERENCE SIGNAL | GUARDING SIGNAL | GUARDING SIGNAL OR REFERENCE SIGNAL |
| 178 | GUARDING SIGNAL OR REFERENCE SIGNAL | GUARDING SIGNAL OR REFERENCE SIGNAL | GUARDING SIGNAL OR REFERENCE SIGNAL |
| 179 | GUARDING SIGNAL OR REFERENCE SIGNAL | GUARDING SIGNAL OR REFERENCE SIGNAL | GUARDING SIGNAL OR REFERENCE SIGNAL |
| 180 | GUARDING SIGNAL OR REFERENCE SIGNAL | GUARDING SIGNAL OR REFERENCE SIGNAL | GUARDING SIGNAL OR REFERENCE SIGNAL |
| 181 | GUARDING SIGNAL OR REFERENCE SIGNAL | GUARDING SIGNAL OR REFERENCE SIGNAL | GUARDING SIGNAL OR REFERENCE SIGNAL |

*Fig. 6*

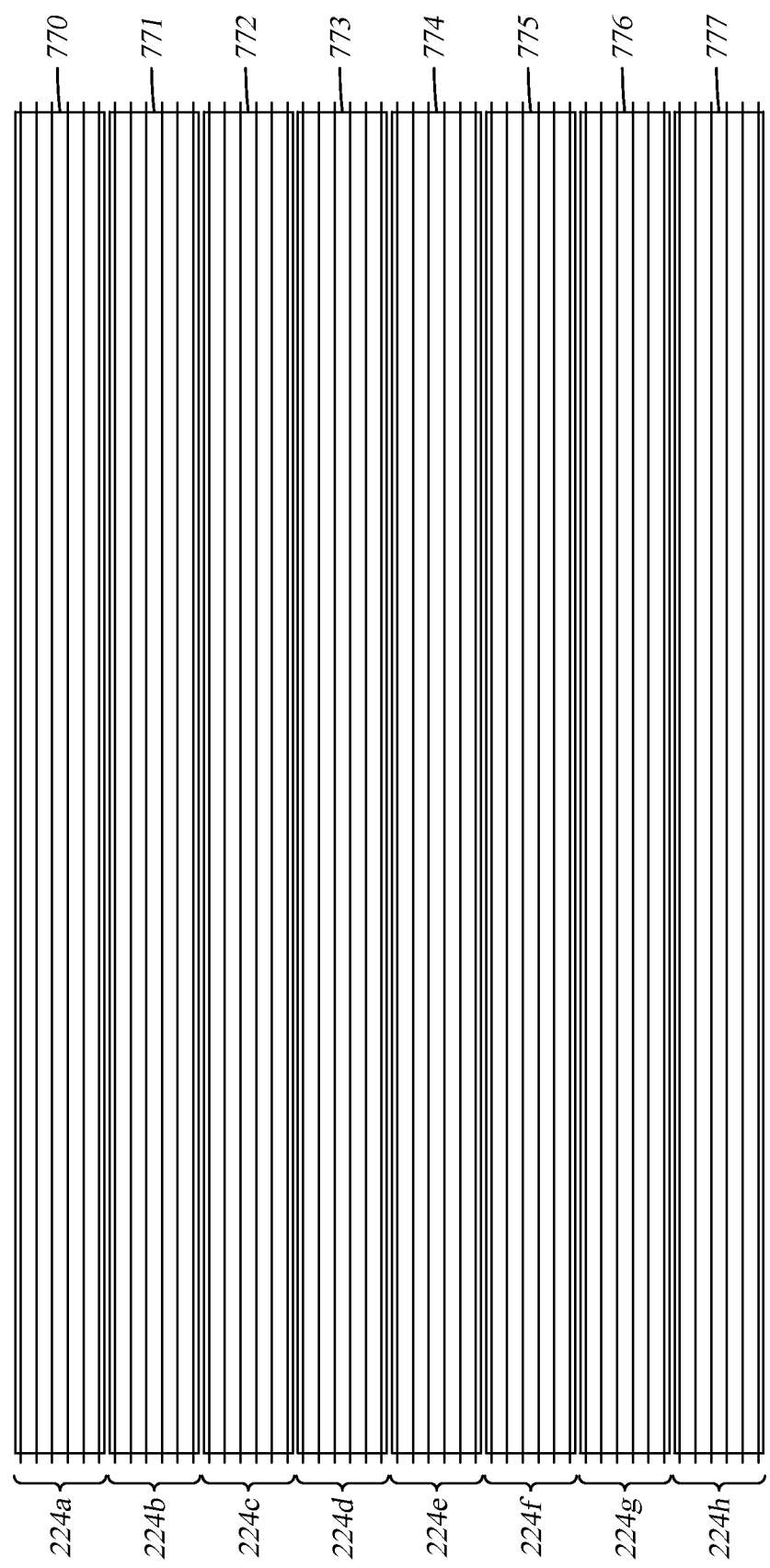

| GATE LINES | ROW | ROW FIRST PERIOD | SECOND PERIOD | THIRD PERIOD | FOURTH PERIOD |
|---|---|---|---|---|---|
| 224a | 770 | REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |
| 224b | 771 | GUARDING SIGNAL | REFERENCE SIGNAL | GUARDING SIGNAL OR REFERENCE SIGNAL | GUARDING SIGNAL OR REFERENCE SIGNAL |
| 224c | 772 | SENSING SIGNAL | GUARDING SIGNAL | REFERENCE SIGNAL | GUARDING SIGNAL OR REFERENCE SIGNAL |
| 224d | 773 | GUARDING SIGNAL | SENSING SIGNAL | GUARDING SIGNAL | REFERENCE SIGNAL |
| 224e | 774 | GUARDING SIGNAL OR REFERENCE SIGNAL | GUARDING SIGNAL | SENSING SIGNAL | GUARDING SIGNAL |
| 224f | 775 | GUARDING SIGNAL OR REFERENCE SIGNAL | GUARDING SIGNAL OR REFERENCE SIGNAL | GUARDING SIGNAL | SENSING SIGNAL |
| 224g | 776 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL |
| 224h | 777 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |

| GATE LINES | ROW | FIFTH PERIOD | SIXTH PERIOD | SEVENTH PERIOD | EIGHTH PERIOD |
|---|---|---|---|---|---|
| 224a | 770 | GUARDING SIGNAL OR REFERENCE SIGNAL | GUARDING SIGNAL OR REFERENCE SIGNAL | SENSING SIGNAL | GUARDING SIGNAL |
| 224b | 771 | GUARDING SIGNAL OR REFERENCE SIGNAL | GUARDING SIGNAL OR REFERENCE SIGNAL | GUARDING SIGNAL | SENSING SIGNAL |
| 224c | 772 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL |
| 224d | 773 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |
| 224e | 774 | REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |
| 224f | 775 | GUARDING SIGNAL | REFERENCE SIGNAL | GUARDING SIGNAL OR REFERENCE SIGNAL | GUARDING SIGNAL OR REFERENCE SIGNAL |
| 224g | 776 | SENSING SIGNAL | GUARDING SIGNAL | REFERENCE SIGNAL | GUARDING SIGNAL OR REFERENCE SIGNAL |
| 224h | 777 | GUARDING SIGNAL | SENSING SIGNAL | GUARDING SIGNAL OR REFERENCE SIGNAL | REFERENCE SIGNAL |

Fig. 8B

| GATE LINES | ROW | FIRST PERIOD | SECOND PERIOD | THIRD PERIOD | FOURTH PERIOD |
|---|---|---|---|---|---|
| 224a | 770 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |
| 224b | 771 | REFERENCE SIGNAL | REFERENCE SIGNAL | GUARDING SIGNAL OR REFERENCE SIGNAL | GUARDING SIGNAL OR REFERENCE SIGNAL |
| 224c | 772 | GUARDING SIGNAL | GUARDING SIGNAL OR REFERENCE SIGNAL | REFERENCE SIGNAL | REFERENCE SIGNAL |
| 224d | 773 | SENSING SIGNAL | GUARDING SIGNAL | GUARDING SIGNAL OR REFERENCE SIGNAL | GUARDING SIGNAL OR REFERENCE SIGNAL |
| 224e | 774 | GUARDING SIGNAL | SENSING SIGNAL | GUARDING SIGNAL | GUARDING SIGNAL OR REFERENCE SIGNAL |
| 224f | 775 | GUARDING SIGNAL OR REFERENCE SIGNAL | GUARDING SIGNAL | SENSING SIGNAL | GUARDING SIGNAL |
| 224g | 776 | GUARDING SIGNAL OR REFERENCE SIGNAL | GUARDING SIGNAL OR REFERENCE SIGNAL | GUARDING SIGNAL | SENSING SIGNAL |
| 224h | 777 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL |

*Fig. 9A1*

| GATE LINES | ROW | FIFTH PERIOD | SIXTH PERIOD | SEVENTH PERIOD | EIGHTH PERIOD |
|---|---|---|---|---|---|
| 224a | 770 | GUARDING SIGNAL OR REFERENCE SIGNAL | SENSING SIGNAL | GUARDING SIGNAL | GUARDING SIGNAL OR REFERENCE SIGNAL |
| 224b | 771 | GUARDING SIGNAL OR REFERENCE SIGNAL | GUARDING SIGNAL | SENSING SIGNAL | GUARDING SIGNAL |
| 224c | 772 | GUARDING SIGNAL OR REFERENCE SIGNAL | GUARDING SIGNAL OR REFERENCE SIGNAL | GUARDING SIGNAL | SENSING SIGNAL |
| 224d | 773 | REFERENCE SIGNAL | REFERENCE SIGNAL | GUARDING SIGNAL OR REFERENCE SIGNAL | GUARDING SIGNAL |
| 224e | 774 | GUARDING SIGNAL OR REFERENCE SIGNAL | GUARDING SIGNAL OR REFERENCE SIGNAL | REFERENCE SIGNAL | REFERENCE SIGNAL |
| 224f | 775 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |
| 224g | 776 | GUARDING SIGNAL | GUARDING SIGNAL OR REFERENCE SIGNAL | GUARDING SIGNAL OR REFERENCE SIGNAL | GUARDING SIGNAL OR REFERENCE SIGNAL |
| 224h | 777 | SENSING SIGNAL | GUARDING SIGNAL OR REFERENCE SIGNAL | GUARDING SIGNAL OR REFERENCE SIGNAL | GUARDING SIGNAL OR REFERENCE SIGNAL |

*Fig. 9A2*

| GATE LINES | ROW | FIRST PERIOD | SECOND PERIOD | THIRD PERIOD | FOURTH PERIOD |
|---|---|---|---|---|---|
| 224a | 770 | GUARDING SIGNAL OR REFERENCE SIGNAL | SENSING SIGNAL | GUARDING SIGNAL | GUARDING SIGNAL OR REFERENCE SIGNAL |
| 224b | 771 | GUARDING SIGNAL OR REFERENCE SIGNAL | GUARDING SIGNAL | SENSING SIGNAL | GUARDING SIGNAL |
| 224c | 772 | GUARDING SIGNAL OR REFERENCE SIGNAL | GUARDING SIGNAL OR REFERENCE SIGNAL | GUARDING SIGNAL | SENSING SIGNAL |
| 224d | 773 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL |
| 224e | 774 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |
| 224f | 775 | REFERENCE SIGNAL | REFERENCE SIGNAL | GUARDING SIGNAL OR REFERENCE SIGNAL | GUARDING SIGNAL OR REFERENCE SIGNAL |
| 224g | 776 | GUARDING SIGNAL | GUARDING SIGNAL OR REFERENCE SIGNAL | REFERENCE SIGNAL | REFERENCE SIGNAL |
| 224h | 777 | SENSING SIGNAL | GUARDING SIGNAL OR REFERENCE SIGNAL | GUARDING SIGNAL OR REFERENCE SIGNAL | GUARDING SIGNAL OR REFERENCE SIGNAL |

*Fig. 9B1*

| GATE LINES | ROW | FIFTH PERIOD | SIXTH PERIOD | SEVENTH PERIOD | EIGHTH PERIOD |
|---|---|---|---|---|---|
| 224a | 770 | GUARDING SIGNAL OR REFERENCE SIGNAL | GUARDING SIGNAL OR REFERENCE SIGNAL | REFERENCE SIGNAL | REFERENCE SIGNAL |
| 224b | 771 | GUARDING SIGNAL OR REFERENCE SIGNAL | GUARDING SIGNAL OR REFERENCE SIGNAL | GUARDING SIGNAL OR REFERENCE SIGNAL | GUARDING SIGNAL OR REFERENCE SIGNAL |
| 224c | 772 | GUARDING SIGNAL | GUARDING SIGNAL OR REFERENCE SIGNAL | GUARDING SIGNAL OR REFERENCE SIGNAL | GUARDING SIGNAL OR REFERENCE SIGNAL |
| 224d | 773 | SENSING SIGNAL | GUARDING SIGNAL | GUARDING SIGNAL OR REFERENCE SIGNAL | GUARDING SIGNAL OR REFERENCE SIGNAL |
| 224e | 774 | GUARDING SIGNAL | SENSING SIGNAL | GUARDING SIGNAL | GUARDING SIGNAL OR REFERENCE SIGNAL |
| 224f | 775 | GUARDING SIGNAL OR REFERENCE SIGNAL | GUARDING SIGNAL | SENSING SIGNAL | GUARDING SIGNAL |
| 224g | 776 | GUARDING SIGNAL OR REFERENCE SIGNAL | GUARDING SIGNAL OR REFERENCE SIGNAL | GUARDING SIGNAL | SENSING SIGNAL |
| 224h | 777 | REFERENCE SIGNAL | REFERENCE SIGNAL | GUARDING SIGNAL OR REFERENCE SIGNAL | GUARDING SIGNAL |

*Fig. 9B2*

REDUCING INTERFERENCE WITHIN A DISPLAY PANEL WHILE PERFORMING INPUT SENSING

BACKGROUND

Field

The disclosure herein is generally related to electronic devices, and more specifically, to reducing the effects of interference caused by a sensing device in a display device.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook computers, desktop computers, automotive multimedia systems, or internet of things (IoT) devices. Proximity sensor devices may also often be used in smaller computing systems, such as touch screens integrated in cellular phones.

SUMMARY

In one example, a processing system for an input device comprises sensor circuitry. The sensor circuitry is configured to operate sensor electrodes for input sensing during a first sensing frame. During a first period of the first sensing frame the sensor circuitry is configured to drive a first portion of the sensor electrodes with a sensing signal, drive a second portion of the sensor electrodes with a guarding signal, and drive a third portion of the sensor electrodes with a reference signal. The guarding signal and the sensing signal have at least one characteristic in common selected from the group consisting of amplitude, phase and frequency. The third portion of the sensor electrodes overlaps a first gate line of a display panel selected for updating during the first period.

In one example, the input device comprises sensor electrodes, and a processing system. The processing system is coupled to the sensor electrodes and is configured to operate the sensor electrodes for input sensing during a first sensing frame. During a first period of the first sensing frame the processing system is configured to drive a first portion of the sensor electrodes with a sensing signal, drive a second portion of the sensor electrodes with a guarding signal, and drive a third portion of the sensor electrodes with a reference signal. The guarding signal and the sensing signal have at least one characteristic in common selected from the group consisting of amplitude, phase and frequency. The third portion of the sensor electrodes overlaps a first gate line of a display panel selected for updating during the first period.

In one example, a method comprises driving, during a first period of a first sensing frame, a first portion of sensor electrodes with a sensing signal, and driving, during the first period, a second portion of the sensor electrodes with a guarding signal. The guarding signal and the sensing signal have at least one characteristic in common selected from the group consisting of amplitude, phase and frequency. The method further comprises driving, during the first period, a third portion of the sensor electrodes with a reference signal. The third portion of the sensor electrodes overlaps a first gate line of a display panel selected for updating during the first period.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 6 is a timing diagram of a capacitive frame, according to one or more embodiments.

FIG. 7 is a schematic side view of a portion of an input device, according to one or more embodiments.

FIGS. 8A, 8B, 9A1, 9A2, 9B1, and 9B2 are timing diagrams of capacitive frames, according to one or more embodiments.

Figure 1:
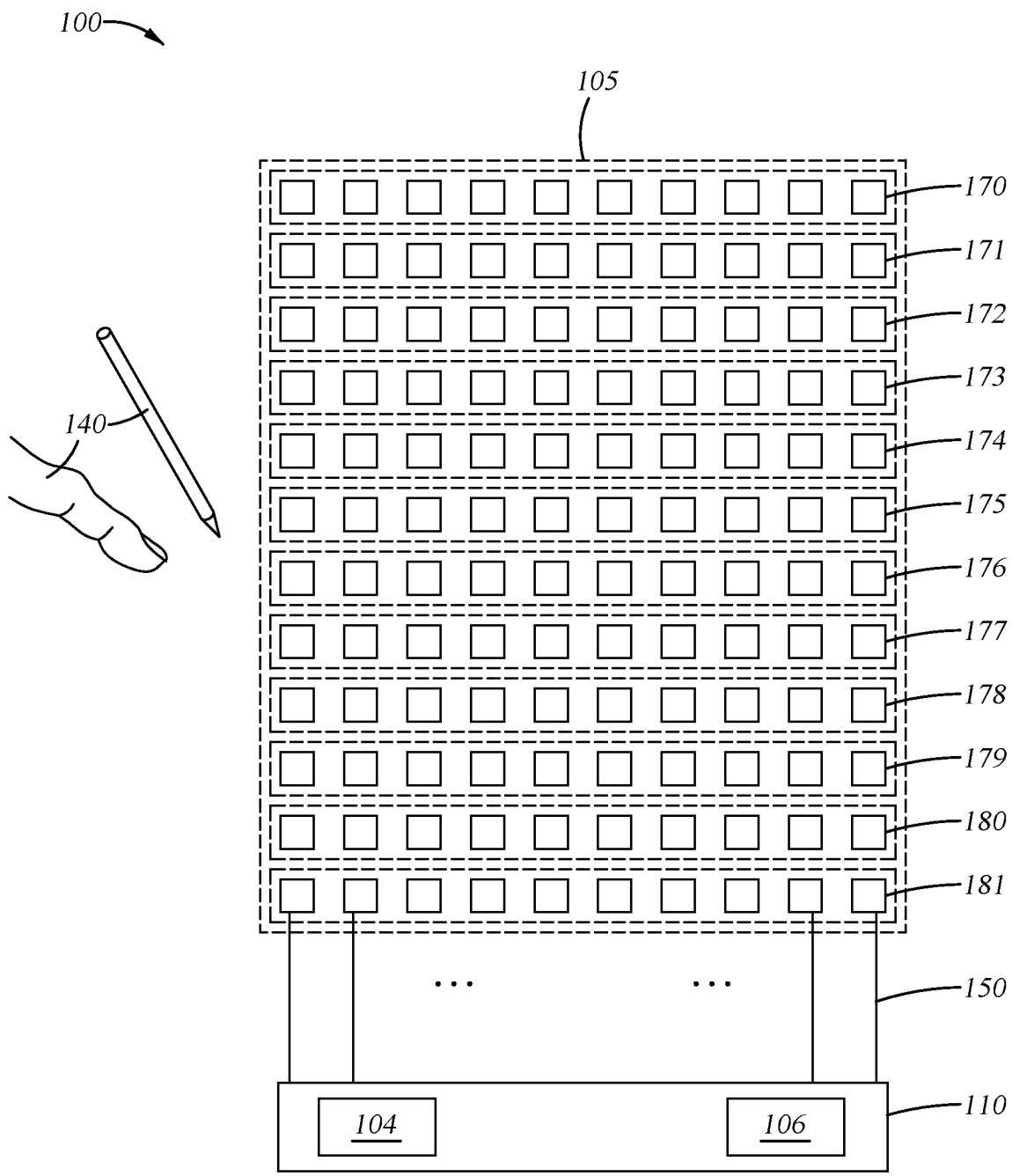
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In many input devices, sensor electrodes are disposed proximate a display device. In such input devices, the display electrodes of the display device capacitively couple with the sensor electrodes. Accordingly, sensing signals driven onto the sensor electrodes may negatively affect updating a display of the display device. Interference is coupled from the driven sensor electrodes to proximate display electrodes driven for display updating, generating display artifacts within the display of the display device. However, by spatially separating the driven sensor electrodes from the display electrodes driven for display updating, interference affecting the driven display electrodes is mitigated, reducing display artifacts.

FIG. 1 illustrates input device 100 configured to reduce display artifacts within a display device. The input device 100 may be configured to provide input to an electronic system (not shown). Some non-limiting examples of electronic systems include desktop computers, laptop computers, netbook computers, tablets, terminals, kiosks, cellular phones, automotive multimedia centers and internet of things (IoT) devices, among others.

The input device 100 includes a processing system 110 and sensor electrodes 105. The processing system 110 operates the sensor electrodes 105 to detect one or more input objects 140 in a sensing region of the input device 100. Example input objects 140 include fingers and styli, as shown in FIG. 1.

The sensing region of the input device 100 encompasses any space above, around, in and/or near the input device 100 in which the input device 100 is able to detect user input, e.g., user input provided by one or more input objects 140.

The sensor electrodes 105 are coupled to the processing system 110 via traces 150. The exemplary pattern of the sensor electrodes 105 illustrated in FIG. 1 comprises an array of sensor electrodes 105 disposed in a plurality of rows and columns. In one example, the sensor electrodes 105 are disposed in rows 170-181. It is contemplated that the sensor electrodes 105 may be arranged in other patterns, such as polar arrays, repeating patterns, non-repeating patterns, non-uniform arrays, or other suitable arrangement. The sensor electrodes 105 may have a shape that is circular, rectangular, diamond, star, square, nonconvex, convex, nonconcave concave, or other suitable geometry.

The sensor electrodes 105 are disposed in a common layer. For example, the sensor electrodes 105 may be disposed on a first side of a common substrate. In other embodiments, the sensor electrodes 105 are disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates.

The sensor electrodes 105 are comprised of a conductive material such as a metal mesh, indium tin oxide (ITO), or the like. Further, the sensor electrodes 105 are ohmically isolated from each other. That is, one or more insulators separate the sensor electrodes and prevent them from electrically shorting to each other.

The processing system 110 includes sensor circuitry 104 and a determination module 106. The processing system 110 is configured to operate the sensor electrodes 105 to detect one or more input objects 140 in the sensing region of the input device 100. The processing system 110 fully or partially resides in one or more integrated circuit (IC) chips. For example, the processing system 110 may include a single IC chip. Alternatively, the processing system 110 includes multiple IC chips.

The sensor circuitry 104 is coupled to the sensor electrodes 105 via the routing traces 150 and is configured to drive the sensor electrodes 105 with sensing signals to detect one or more input objects 140 in the sensing region of the input device 100.

The sensor circuitry 104 includes digital and/or analog circuitry. For example, the sensor circuitry 104 comprises transmitter (or driver) circuitry configured to drive sensing signals onto the sensor electrodes 105 and receiver circuitry to receive resulting signals from the sensor electrodes 105.

The transmitter circuitry may include one or more amplifiers and/or one or more modulators configured to drive sensing signals on to the sensor electrodes 105. The receiver circuitry may include analog front ends (AFEs) comprising integrator circuitry, filter circuitry, and/or demodulator circuitry configured to receive and/or process resulting signals from the sensor electrodes 105.

The sensor circuitry 104 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between one or more sensor electrodes driven with a transcapacitive sensing signal and one or more sensor electrodes operated as receiver electrodes. The capacitive coupling is reduced when an input object (e.g., the input object 140) coupled to a system ground approaches the sensor electrodes. Driving the sensor electrodes 105 with transcapacitive sensing signals comprises modulating the sensor electrodes 105 relative to a reference voltage, e.g., system ground.

The transcapacitive sensing signal is a periodic or aperiodic signal that varies between two or more voltages. Further, the transcapacitive sensing signal has a frequency between 100 kHz and 1 MHz. In other embodiments, other frequencies may be utilized. The transcapacitive sensing signal has a peak to peak amplitude in a range of about 1 V to about 10 V. However, in other embodiments, the transcapacitive sensing signal may have a peak to peak amplitude greater than about 10 V. Additionally, the transcapacitive sensing signal has a square waveform, a sinusoidal waveform, triangular waveform, a trapezoidal waveform, or a sawtooth waveform, among others.

Operating the sensor electrodes 105 to receive resulting signals comprises holding one or more of the sensor electrodes 105 at a substantially constant voltage or modulating one or more of the sensor electrodes 105 relative to the transcapacitive sensing signal. For example, operating one or more sensor electrodes 105 to receive resulting signals by modulating the one or more sensor electrodes 105 relative to the transcapacitive sensing signal includes modulating the one or more sensor electrodes 105 with a signal that has an amplitude, phase, waveform, and/or frequency different than that of the transmitter signal. A resulting signal includes effect(s) corresponding to one or more transcapacitive sensing signals, and/or to one or more sources of environmental interference, e.g., other electromagnetic signals.

The sensor circuitry 104 operates the sensor electrodes 105 for absolute capacitive sensing by driving a first one or more of the sensor electrodes 105 with an absolute capacitive sensing signal and receiving a resulting signal with the driven sensor electrodes. Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes.

The absolute capacitive sensing signal is a periodic or aperiodic signal that varies between two or more voltages. Further, the absolute capacitive sensing signal has a frequency between 100 kHz and 1 MHz. In other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal has a peak to peak amplitude in a range of about 1 V to about 10 V. However, in other embodiments, the absolute capacitive sensing signal may have a peak to peak amplitude greater than about 10 V. In various embodiments, driving the sensor electrodes 105 with an absolute capacitive sensing signal comprises modulating the sensor electrodes 105. A resulting signal received while performing absolute capacitive sensing comprises effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

The sensor circuitry 104 operates a first portion of the sensor electrodes 105 for absolute capacitive sensing during a first period. The first portion of the sensor electrodes 105 corresponds to one or more sensor electrodes 105. In one embodiment, the first portion includes less than all of the sensor electrodes 105. In such embodiment, the first portion of the sensor electrodes 105 corresponds to a first subset of the sensor electrodes 105. As illustrated in FIG. 1, the sensor electrodes 105 are disposed in a plurality of rows 170-181. Each row 170-181 includes one or more of the sensor electrodes 105. Further, each of the rows 170-181 includes the same number of the sensor electrodes 105. In other embodiments, one or more of the rows 170-181 has a different number of the sensor electrodes 105 than another one or more of the sensor electrodes 105. The first portion of the sensor electrodes 105 corresponds to one or more of the rows 170-181. Further, the first portion of the sensor electrodes may correspond to two or more of the rows 170-181. In other embodiments, the sensor circuitry 104 operates the first portion of the sensor electrodes 105 for transcapacitive sensing.

The sensor circuitry 104 may simultaneously operate two or more of the sensor electrodes 105 for absolute capacitive sensing. For example, the sensor circuitry 104 simultaneously operates each sensor electrode 105 of a first portion of the sensor electrodes 105 for absolute capacitive sensing. The sensor circuitry 104 may simultaneously operate each sensor electrode 105 of a common row (e.g., rows 170-181) for absolute capacitive sensing. Further, the sensor circuitry 104 may simultaneously operate each sensor electrode 105 of two or more rows (e.g., two or more of rows 170-181) for absolute capacitive sensing. In other embodiments, the sensor circuitry 104 operates two or more of the sensor electrodes 105 for transcapacitive sensing. For example, the sensor circuitry 104 simultaneously drives a first one or more of the sensor electrodes 105 with a transmitter signal and simultaneously receives resulting signals from a second one or more of the sensor electrodes 105. The sensor electrodes 105 driven with a transmitter signal and the sensor electrodes 105 operated as receiver electrodes may be part of a common row or different rows of the rows 170-181.

The sensor circuitry 104 drives a second portion of the sensor electrodes 105 with a guarding signal during the first period. The second portion of the sensor electrodes 105 corresponds to one or more of the sensor electrodes 105 not included in the first portion of the sensor electrodes 105 and/or driven for absolute capacitive sensing (or driven for transcapacitive sensing). The second portion may include less than all of the sensor electrodes 105. In such an embodiment, the second portion corresponds to a second subset of the sensor electrodes 105. In one embodiment, the second portion of the sensor electrodes 105 corresponds to two or more of the sensor electrodes 105 not included in the first portion of the sensor electrodes 105. The second portion of the sensor electrodes 105 corresponds to one or more of the rows 170-181 not included in the first portion of the sensor electrodes 105. In one embodiment, the second portion of the sensor electrodes 105 corresponds to two or more rows 170-181 not included in the first portion of the sensor electrodes 105. The second portion of the sensor electrodes 105 corresponds to more sensor electrodes than the first portion of the sensor electrodes 105. Alternatively, the second portion of the sensor electrodes 105 corresponds to less sensor electrodes than the first portion of the sensor electrodes 105. In one embodiment, the first and second portions of the sensor electrodes 105 corresponds to the same number of sensor electrodes.

The sensor circuitry 104 simultaneously drives the sensor electrodes of the second portion of the sensor electrodes 105 with a guarding signal. For example, the sensor circuitry 104 simultaneously drives the sensor electrode of one or more rows (e.g., rows 170-181) associated with the second portion of the sensor electrodes 105 with a guarding signal. Simultaneously driving the sensor electrodes of one or more rows (e.g., rows 170-181) of the sensor electrodes 105 with the guarding signal comprises driving each sensor electrode 105 of one or more rows (e.g., rows 170-181) of the sensor electrodes 105 with the guarding signal.

A sensor electrode driven with a guarding signal may be referred to as a guarded sensor electrode. Driving a sensor electrode with a guarding signal can mitigate a voltage difference between a guarded sensor electrode and a sensor electrode driven with the absolute capacitive sensing signal. Accordingly, by driving the guarding signal onto a first one or more sensor electrodes while driving the absolute capacitive sensing signal onto a second one or more sensor electrodes, there is little or no change in capacitance between the guarded sensor electrode(s) and the sensor electrode(s) driven with the absolute capacitive sensing signal.

In one embodiment, the guarding signal has at least one characteristic selected from a group consisting of amplitude, a phase, and a frequency in common with the absolute capacitive sensing signal. In other words, the guarding signal and the absolute sensing signal may have a common amplitude, a common phase, a common frequency, or any combination thereof. In some embodiments, the amplitude of the guarding signal is less than or greater than that of the absolute capacitive sensing signal. In embodiments where the amplitude of the guarding signal is less than the amplitude of the absolute capacitive sensing signal, partial guarding between the sensor electrodes driven with the guarding signal and the sensor electrodes driven with the absolute capacitive sensing signal is achieved such that capacitive coupling between the sensor electrodes is at least partially reduced. In embodiments where the amplitude of the guarding signal is greater than the amplitude of the absolute capacitive sensing signal, over guarding between the sensor electrodes driven with the guarding signal and the sensor electrodes driven with the absolute capacitive sensing signal is achieved.

The guarding signal and the absolute capacitive sensing signal may have a common waveform shape. Further, in one embodiment, the guarding signal may be the same as the absolute capacitive sensing signal.

The sensor circuitry 104 drives a third portion of the sensor electrodes 105 with a reference signal. The third portion of the sensor electrodes 105 are the sensor electrodes 105 not included within the first portion of the sensor electrodes 105 and the second portion of the sensor electrodes 105. Further, the third portion may include less than all of the sensor electrodes 105. In such embodiments, the third portion corresponds to a third subset of the sensor electrodes 105. The sensor circuitry 104 drives one or more rows (e.g., rows 170-181) of the sensor electrodes 105 with a reference signal. The one or more rows of the rows 170-181 of the sensor electrodes 105 driven with the reference signal include rows of the rows 170-181 not operated for absolute capacitive sensing or rows 170-181 not driven with the guarding signal. Driving one or more rows (e.g., rows 170-181) of the sensor electrodes 105 with a reference signal comprises sequentially driving each sensor electrode 105 of one or more rows (e.g., rows 170-181) of the sensor electrodes 105 with the reference signal. The reference signal is a constant voltage signal. For example, the reference signal is a direct current (DC) signal. In one embodiment, the reference signal is a ground signal of the input device 100.

In one or more embodiments, the sensor circuitry 104 electrically floats the third portion of the sensor electrodes 105. The sensor circuitry 104 electrically floats one or more of the sensor electrodes 105. Electrically floated sensor electrodes are not actively driven by the sensor circuitry 104. For example, the sensor circuitry 104 may be decoupled from the one or more sensor electrodes 105 to electrically float the one or more sensor electrodes. Further, the sensor circuitry 104 may maintain the sensor electrodes in a high impedance state to electrically float the one or more sensor electrodes.

The first portion, the second portion, and the third portion of the sensor electrodes 105 may comprise the same number or different numbers of the sensor electrodes 105. For example, the third portion may include more the sensor electrodes than the first portion and/or the second portion of the sensor electrodes 105.

As is described above, the sensor circuitry 104 receives resulting signals from the sensor electrodes 105 driven with absolute capacitive sensing signals. The sensor circuitry 104 integrates, filters, and/or demodulates the resulting signals. The determination module 106 receives the resulting signals from the sensor circuitry 104 and processes the resulting signals to determine changes in capacitive coupling of the sensor electrodes 105. The determination module 106 utilizes the changes in capacitive coupling of the sensor electrodes 105 to determine positional information of one or more input objects (e.g., the input object 140).

In one or more embodiments, measurements of the changes in capacitive coupling determined from the resulting signals received from the sensor electrodes 105 may be utilized by the determination module 106 to form a capacitive image. The resulting signals utilized to detect the changes in capacitive coupling are received during a capacitive frame. A capacitive frame may be referred to as a sensing frame or a capacitive sensing frame. A capacitive frame may correspond to one or more capacitive images. Further, during each capacitive frame, each of the sensor electrodes 105 is operated for capacitive sensing. For example, during one or more capacitive frames, the sensor electrodes 105 are operated for absolute capacitive sensing. Further, during one or more capacitive frames, the sensor electrodes 105 are operated for transcapacitive sensing. In one or more capacitive frames, the sensor electrodes 105 are operated for absolute capacitive sensing and transcapacitive sensing. Multiple capacitive images may be acquired over multiple time periods, and differences between the images used to derive information about an input object 140 in the sensing region of the input device 100. For example, successive capacitive images acquired over successive periods of time can be used to track the motion(s) of one or more input objects entering, exiting, and within the sensing region.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
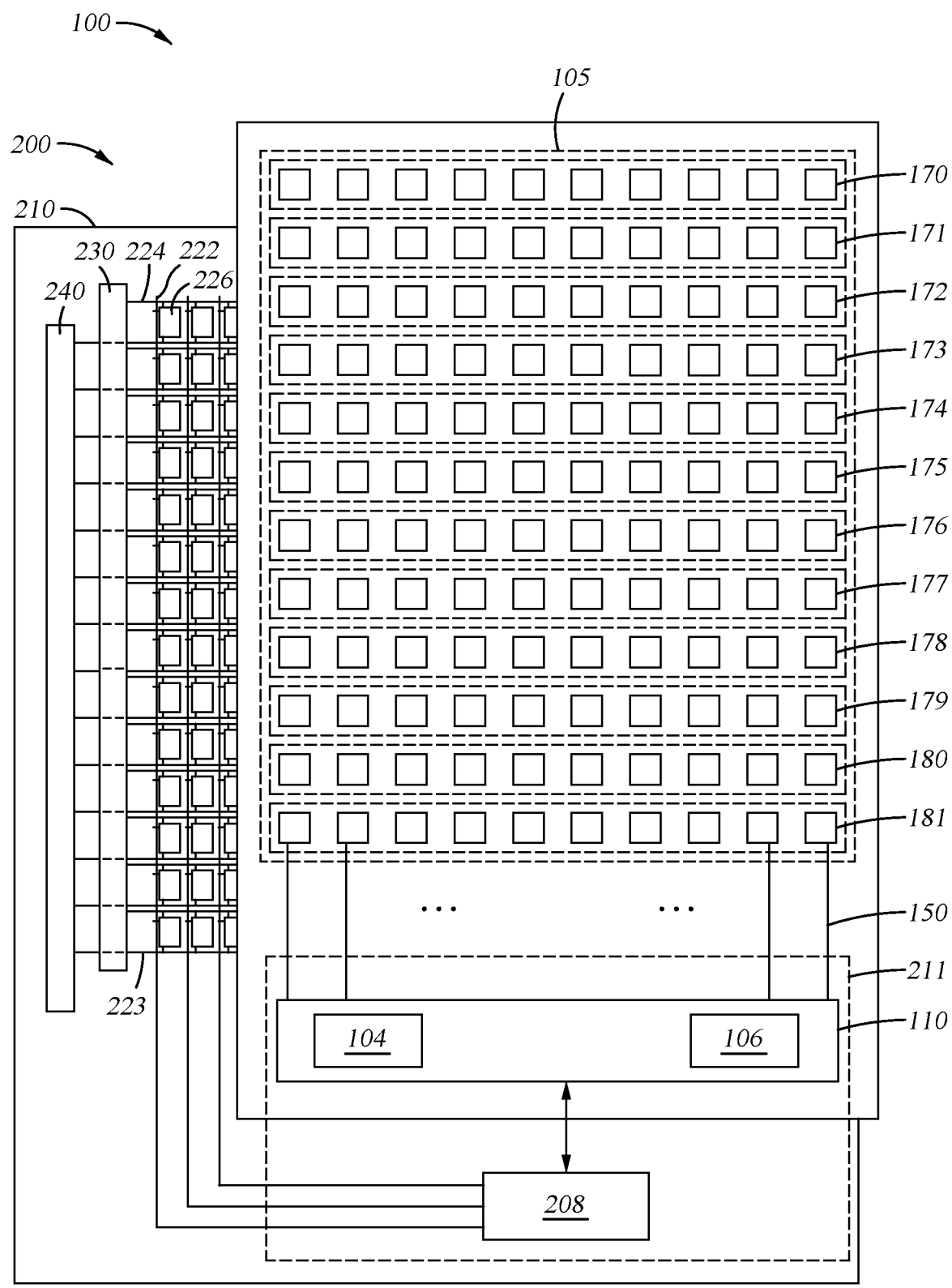
FIG. 2 is a schematic block diagram of an input device and display device, according to one or more embodiments.

In some embodiments, the input device 100 is a touch screen interface that overlaps at least part of a display of a display device. For example as illustrated in FIG. 2, the input device 100 is shown overlapped with a display of a display device 200. The display device 200 may include a display panel 210 communicatively coupled with a display driver 208 and gate selection circuitry 230. The display panel 210 may include display electrodes that are driven to update the subpixels 226 of the display panel 210. The display electrodes may include data lines 222, gate lines 224, and/or emission control lines 223, among others. In one embodiment, the display panel 210 is an organic light emitting diode (OLED) display. In such embodiment, the display panel 210 includes the data lines 222, gate lines 224, and emission control lines 223. In another embodiment, the display panel 210 is a light emitting device (LED). In such embodiment, the display panel 210 includes the data lines 222 and gate lines 224 and does not include the emission control lines 223.

The data lines 222 may be coupled to the display driver 208 and the gate lines 224 may be coupled to the gate selection circuitry 230. Further, the emission control lines 223 may be coupled to the emission control circuitry 240. Each of the subpixels 226 may be coupled to one of the gate lines 224 and one of the data lines 222. Further, in one or more embodiments, each of the subpixels 226 is coupled to an emission control line 223.

The gate selection circuitry 230 may be configured to drive gate select and gate deselect signals onto the gate lines 224 to select (activate) and deselect (deactivate) corresponding subpixels for updating. Gate select signals may be referred to as voltage gate high signals ($V_{gh}$) and gate deselect signals may be referred to as voltage gate low signals ($V_{gl}$). Driving a gate line 224 with a gate select signal turns on one or more transistors of the subpixels 226 coupled to the driven gate line, selecting (e.g., turning on) the corresponding subpixels 226 for display updating. Driving a gate line 224 with a gate deselect signal turns off one or more transistors of the subpixels 226 coupled to driven the gate line, deselecting (e.g., turning on) the corresponding subpixels 226 for display updating. The gate select and deselect signals may be voltage signals. The voltage level of the gate select signal may be higher than the voltage level of the gate deselect signals. For example, the gate select signal has a voltage level greater than or equal to the turn-on voltage of the one or more transistors of the subpixels 226. Further, the gate deselect signal has a voltage level less than the turn-on voltage of the one or more transistors of the subpixels 226. In one embodiment, the gate select signal has a voltage level of about 15 v and the gate deselect signal has a voltage level of about −5 v. In other embodiments, gate select signals have a voltage level greater than or less than 15 v and/or the gate deselect signals have a voltage level greater than or less than −5 v.

The gate selection circuitry 230 may include one or more shift registers and one or more drivers. Further, the gate selection circuitry 230 may be communicatively coupled with the display driver 208 and receive control signals from the display driver 208 to control the selecting and deselecting of the gate lines 224.

The emission control lines 223 are driven by the emission control circuitry 240 and control the brightness of the subpixels 226. The emission control circuitry 240 may include one or more shift registers and one or more drivers. The emission control circuitry 240 drives emission control signals onto the emission control lines 223. The emission control signals control the duty cycle of the subpixels 226 coupled to each of the emission control lines 223, thereby controlling the brightness of the subpixels 226.

The display driver 208 includes display driver circuitry configured to drive the data lines 222 with subpixel data signals to update the selected subpixels 226 and update the display of the display device 200. For example, the display driver 208 may drive display update signals onto the data lines 222 during corresponding display updating periods. The display updating periods are part of a display frame. Further, the display driver 208 communicates control signals to the gate selection circuitry 230 and/or the emission control circuitry 240 to control the selection and deselection of gate lines 224 and the brightness of the subpixels 226.

The display driver 208 is configured to update the subpixels 226 to update an image displayed on the display panel 210 during display frames. The display frames may be updated, or refreshed, once about every 16 ms, generating a display frame rate of about 60 Hz. In other embodiments, other display frame rates may be employed. For example, the display frame rate may be 90 Hz, 120 Hz, 140 Hz, or greater.

During a display frame, each gate line 224 may be sequentially selected, e.g., driven with a gate select signal. For example, the gate lines 224 may be sequentially selected by sequentially driving the gate lines 224 with gate select signals and gate deselect signals according to a common order during each display frame. In one embodiment, the gate lines 224 are sequentially selected from a first gate line of the gate lines 224 to a last gate line of the gate lines 224. The first gate line may proximate a first side (end) of the display panel 210 and the last gate line may proximate a second side (end) of the display panel 210, the first end opposite the second end.

The display driver 208, the sensor circuitry 104, and the determination module 106 may be part of one processing system (e.g., the processing system 211). Alternatively, the display driver 208 may be part of a first processing system and the sensor circuitry 104 and the determination module 106 may be part of a second, separate, processing system. Further, the display driver 208, the sensor circuitry 104, and the determination module 106 may be part of a common IC chip. Alternatively, one or more of the display driver 208, the sensor circuitry 104, and the determination module 106 may be disposed in a first IC chip and a second one or more of the display driver 208, the sensor circuitry 104, and the determination module 106 are disposed on a second IC chip.

In various embodiments, the sensor circuitry 104 is configured to drive the sensor electrodes for capacitive sensing during a capacitive frame at a capacitive frame rate. In one embodiment, during each capacitive frame, each sensor electrode 105 is operated for absolute capacitive sensing. Further, each capacitive frame may include multiple periods during which different sensor electrodes 105 are operated for absolute capacitive sensing.

The "capacitive frame rate" (the rate at which successive capacitive images are acquired) may be the same or be different from that of the "display frame rate" (the rate at which the display image is updated, including refreshing the screen to redisplay the same image). The capacitive frame rate may be an integer multiple of the display frame rate, a fractional multiple of the display frame rate, a rational fraction of the display frame rate (e.g., 1/2, 2/3, 1/1, 3/2, 2/1, etc.), or any suitable fraction or multiple of the display frame rate. In one or more embodiments, the display frame rate may change while the capacitive frame rate remains constant. In other embodiment, the display frame rate may remain constant while the capacitive frame rate is increased or decreased. Alternately, the capacitive frame rate may be unsynchronized from the display frame rate or the capacitive frame rate may be a non-rational fraction of the display frame rate to minimize interference "beat frequencies" between the display updating and the input sensing.

Capacitive sensing (or input sensing) and display updating may occur during at least partially overlapping periods. For example, the sensor circuitry 104 is configured to operate the sensor electrodes 105 for capacitive sensing while the display driver 208 operates the gate lines 224 and data lines 222 (and emission control lines) to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

Updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be blanking periods that occur between the last line of a display frame and the first line of the following display frame (e.g., during a vertical blanking period). Each display line correspond to one or more gate lines 224 and the subpixels 226 coupled to the gate lines 224. Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figure 3:
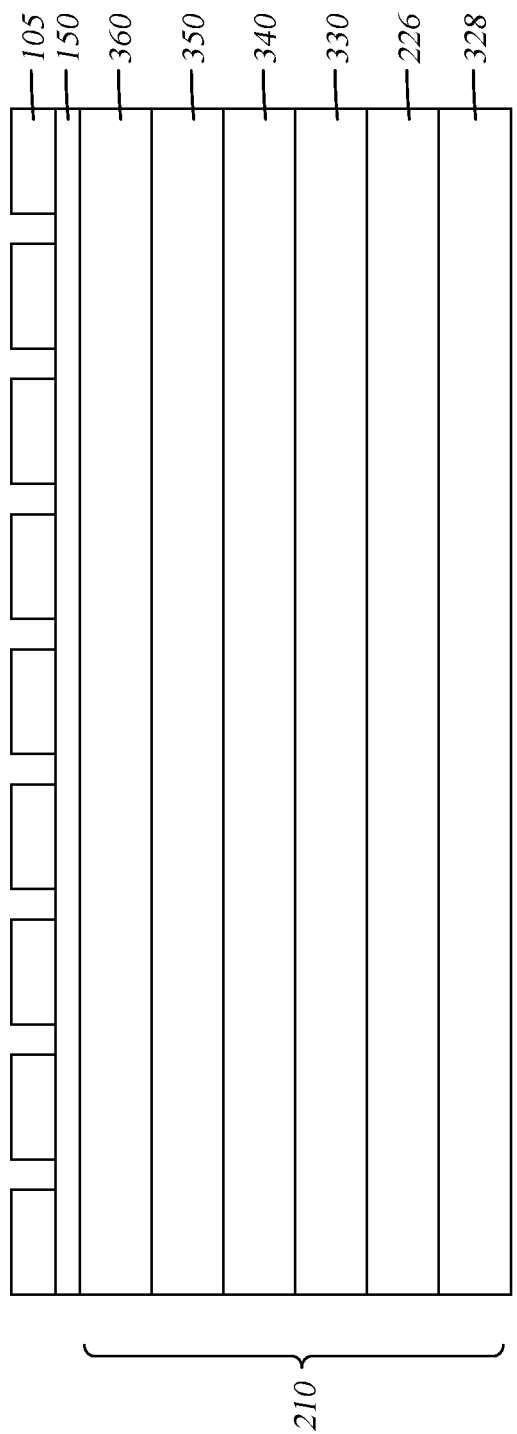
FIG. 3 is a schematic side view of an input device, according to one or more embodiments.

FIG. 3 illustrates a partial side view of the input device 100 and the display device 200, according to one or more embodiments. In the embodiment of FIG. 3, the display panel 210 is an OLED display panel. However, in other embodiments, other display types (e.g., LCDs or the like) may be utilized.

As illustrated, the display panel 210 includes a substrate 328, the subpixels 226, organic material layers 330, a cathode electrode 340, display layers 350, and an encapsulation layer 360. The cathode electrode 340 may be a sheet of resistive material configured to overlap the subpixel 226. The cathode electrode 340 may be coupled with and driven by the display driver 208 to supply a low impedance reference voltage. In embodiments where the display panel 210 is an LCD panel, the cathode electrode 340 is replaced with a common voltage (Vcom) electrode layer. Further, the cathode electrode 340 (or the Vcom electrode layer) may be referred to as a reference electrode layer.

The substrate 328 may be a flexible substrate. Alternatively, the substrate 328 may be rigid. The display layers 350 may include one or more polarizers and a color filter glass, among others. As illustrated, the sensor electrodes 105 are disposed on the encapsulation layer 360. In embodiments comprising a lens, the sensor electrodes 105 may be disposed on a lens instead of the encapsulation layer 360. The lens may be disposed over the encapsulation layer 360 or included instead of the encapsulation layer 360.

The traces 150 are disposed in a layer between the sensor electrodes 105 and the display panel 210. Alternatively, the traces 150 are disposed in a layer of the display panel 210 between the substrate 328 and the encapsulation layer 360. In other embodiments, the traces 150 are disposed in the same layer as the sensor electrodes 105.

As discussed above, as the sensor electrodes 105 are disposed over the display panel 210, the display electrodes of the display panel 210 may capacitively couple with the sensor electrodes 105, introducing interference into the display panel 210 when capacitive sensing is performed. By spatially separating the sensor electrode 105 driven for capacitive sensing (e.g., driven with an absolute capacitive sensing signal or a transcapacitive sensing signal) from the gate line(s) 224 selected for display updating, the interference introduced into the display panel 210 during display updating may be mitigated, thereby reducing display artifacts within the display panel 210.

Figure 4:
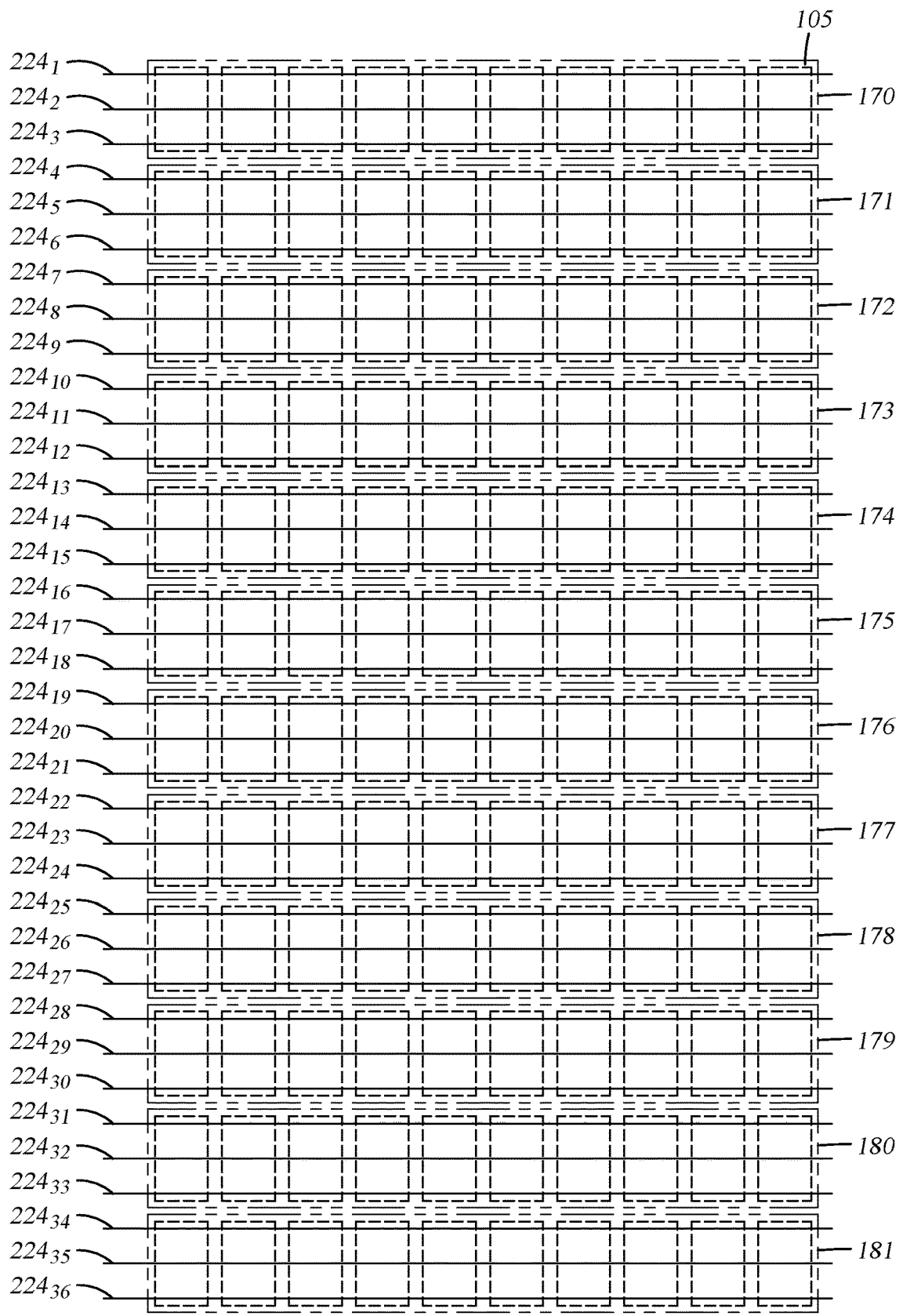
FIG. 4 is a schematic side view of a portion of an input device, according to one or more embodiments.

FIG. 4 is a simplified illustration of a portion of the sensor electrodes 105 and the display panel 210. The sensor electrodes 105 are illustrated in phantom such that the gate lines 224 are visible. The data lines 222, subpixels 226, and emission control lines 223 have been omitted for simplification purposes. Further, while FIG. 4 illustrates 36 gate lines (e.g., gate lines $224_1$-$224_{36}$), in other embodiments, more than 36 gate lines may be included. For example, the number of gate lines 224 may be in the thousands. Further, as illustrated in the embodiment of FIG. 4, each sensor electrode 105 overlaps 3 gate lines. However, in other embodiments, each sensor electrode 105 may overlaps a different number of gate lines.

Figure 5:
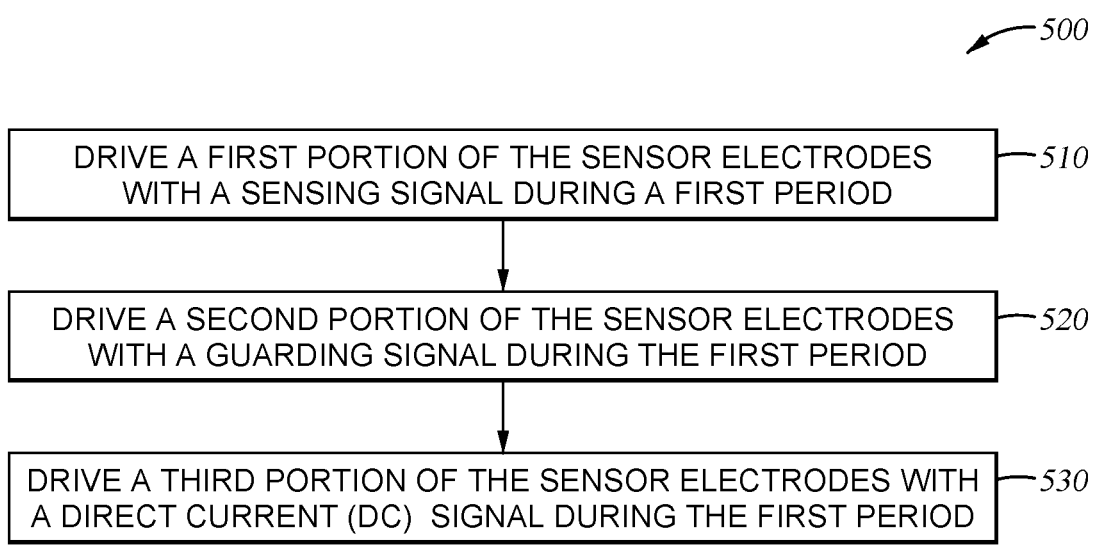
FIG. 5 is a flow chart of a method for performing capacitive sensing, according to one or more embodiments.

FIG. 5 is a flowchart illustrating a method 500 for reducing display artifacts caused by interference introduced while performing capacitive sensing, according to one or more embodiments. The method 500 is described with reference to FIGS. 2, 4, 5 and 6. At operation 510, the sensor circuitry 104 drives a first portion of the sensor electrodes 105 with a sensing signal during a first period. The sensing signal may be an absolute capacitive sensing signal. Further, the sensor circuitry 104 acquires a corresponding resulting signal from each driven sensor electrode. For example, the sensor circuitry 104 drives each sensor electrode of the row 175 with an absolute capacitive sensing signal during the first period to acquire a corresponding resulting signal from each driven sensor electrode. The first period corresponds to a first part of a first capacitive frame. Further, the first period corresponds to a first part of a first display frame. FIG. 6 illustrates a portion of the capacitive frame 600 (e.g., the first capacitive frame). The capacitive frame 600 overlaps at least a portion of a display frame. As illustrated, the capacitive frame 600 includes at least three periods during which capacitive sensing is performed. For example, the capacitive frame 600 includes at least a first period, a second period, and a third period. In various embodiments, the capacitive frame 600 includes additional periods such that each of the sensor electrodes 105 are operated for absolute capacitive sensing before the completion of the capacitive frame. The additional periods may occur before the first period, after the third period and/or between the first, second, and third periods.

At operation 520, each sensor electrode of a second portion of sensor electrodes is driven with a guarding signal during the first period. For example, the sensor circuitry 104 drives each sensor electrode of the row 173 with a guarding signal during the first period. Alternatively, the sensor electrodes of the row 173 are driven with a reference signal during the first period.

At operation 530, a third portion of the sensor electrodes 105 is driven with a reference signal (e.g., DC signal) during the first period. The second portion of the sensor electrodes 105 is disposed between the first portion and third portion of the sensor electrodes 105. The operation 530 includes driving each sensor electrode of a third row of sensor electrodes with a reference signal during the first period. For example, in one embodiment, the sensor electrodes of the row 170 are driven with a reference signal by the sensor circuitry 104 during the first period. The sensor electrodes of the row 170 (e.g., the third portion) overlap the gate line $224_1$ which is selected for display updating during the first period. During the first period, the subpixels 226 coupled to the gate line $224_1$ are selected and driven by corresponding data lines 222 for display updating during the first period. Driving the sensor electrodes 105 of the row 170 with the reference signal during the first period mitigates interference that is coupled into the display panel 210 while the gate line $224_1$ is selected and the corresponding subpixels 226 are driven for display updating.

Driving, during the first period, the sensor electrodes 105 of the row 175 (e.g., the first portion of the sensor electrodes 105) with the absolute capacitive sensing signal, driving the sensor electrodes 105 of the row 173 (e.g., the second portion of the sensor electrodes 105) with a guarding signal, and driving the sensor electrodes 105 of the row 170 (e.g., the third portion of the sensor electrodes 105) with the reference signal at least partially overlap with each other. In other embodiments, driving, during the first period, the sensor electrodes 105 of the row 175 (e.g., the first portion of the sensor electrodes 105) with the absolute capacitive sensing signal, driving the sensor electrodes 105 of the row 173 (e.g., the second portion of the sensor electrodes 105) with a guarding signal, and driving the sensor electrodes 105 of the row 170 (e.g., the third portion of the sensor electrodes 105) with the reference signal occur simultaneously with each other.

The sensor circuitry 104 additionally drives the sensor electrodes of the rows 174 and 176 with the guarding signal during the first period. The rows 174 and 176 are adjacent to the row 175 (e.g., the first portion of the sensor electrodes 105). For example, the row 174 is positioned on a first side of the row 175 and the row 176 is positioned on a second side of the row 175. Further, during the first period, the sensor electrodes of the rows 171-173 and 177-181 are driven with a guarding signal or a reference signal.

As described above, FIG. 6 illustrates a capacitive frame 600 that includes at least three periods (the first period, the second period, and the third period). However, in other embodiments, the capacitive frame 600 may include more than three periods. For example additional periods may occur after the third period, before the first period, between the first period and the second period, and/or between the second period and the third period. During each period, the sensor electrodes 105 of one or more of the rows 170-181 (e.g., one or more portions) is driven with a sensing signal (e.g., an absolute capacitive sensing signal or a transcapacitive sensing signal), the sensor electrodes 105 of one or more of the rows 170-181 is driven with a guarding signal or a reference signal, the sensor electrodes 105 of one or more of the rows 170-181 is driven with a reference signal, and the sensor electrodes 105 of one or more of the rows 170-181 is driven with a guarding signal. Further, during each of the periods (e.g., the first period, the second period, and the third period), the sensor electrodes 105 of the rows 170-181 that are adjacent to the sensor electrodes 105 of the row driven with the sensing signal are driven with a guarding signal.

As is illustrated by FIG. 6, during the first period the sensor electrodes 105 of the row 170 is driven with a reference signal, the sensor electrodes 105 of the row 175 is driven with a sensing signal, and the sensor electrodes 105 of the rows 174 and 176 are driven with a guarding signal. Further, the sensor electrodes 105 of the rows 171-173 and the sensor electrodes 105 of the rows 177-181 are driven with a guarding signal or a reference signal. Alternatively, the sensor electrodes 105 of one or more of the rows 171-173 and 177-181 are electrically floated such that the sensor electrodes 105 are not actively driven.

The display electrodes (e.g., the data lines 222, the gate lines 224) of the display panel 210 are driven to update the display panel 210. As is disclosed above, the capacitive frame 600 overlaps at least a portion of a display frame. In one embodiment, the length of the capacitive frame 600 and the length of the display frame are the same. Alternatively, the length of the capacitive frame 600 is less than the length of the display frame. For example, the capacitive frame 600 occurs during the display frame and is completed before the end of the display frame.

During the first period, the gate line $224_1$ is driven with a gate select signal for updating the display panel 210. Further, with reference to FIG. 4, the sensor electrodes 105 of the row 170 overlap (e.g., are disposed above) the gate line $224_1$. The varying voltage of a sensing signal or guarding signal driven on the sensor electrodes 105 introduces interference into the display electrodes (e.g., the gate lines 224, the data lines 222, and/or the subpixels 226). For example, the sensor electrodes 105 driven with the sensing signal or guarding signal may negatively affect the voltages of the selected subpixels 226 that are driven with display update voltages via the data lines 222. Accordingly, one or more of the subpixels 226 may be driven to an incorrect voltage, resulting in color and/or brightness artifacts (e.g., display artifacts) within the display panel 210. However, driving the sensor electrodes 105 of the row 170 with the reference signal can reduce interference introduced into the display panel 210, thereby mitigating display artifacts. For example, driving (or holding) the sensor electrodes 105 disposed over a gate line 224 and corresponding subpixels 226 selected for updating with a reference signal mitigates interference introduced into the display panel 210, beneficially mitigating display artifacts.

With further reference to FIG. 6, during the second period of the capacitive frame 600, the sensor electrodes 105 of the row 176 (e.g., a fourth portion of the sensor electrodes 105) are driven with the sensing signal for absolute capacitive sensing. Further, the sensor electrodes 105 of the rows 175 and 177 are driven with the guarding signal during the second period. The sensor electrodes 105 of the row 173 are driven with the reference signal. The sensor electrodes 105 of the rows 170-172, the row 174, and/or the row 178-181 are driven with the guarding signal or the reference signal.

The second period is subsequent the first period. Further, during the second period, the gate line $224_7$ is selected for display updating. The sensor electrodes 105 of the row 173 are disposed over (e.g., overlap) the gate line $224_7$, and driving the sensor electrodes 105 of the row 173 with the reference signal mitigates interference that is introduced into the display panel 210 during updating, beneficially reducing display artifacts.

During the third period of the capacitive frame 600, the sensor electrodes 105 of the row 173 (e.g., a second portion of the sensor electrodes 105) are driven with the sensing signal for absolute capacitive sensing. Further, the sensor electrodes 105 of the rows 172 and 174 are driven with the guarding signal during the second period. The sensor electrodes 105 of the row 175 are driven with the reference signal. The sensor electrodes 105 of the rows 170-171, and/or the row 176-181 are driven with the guarding signal or the reference signal.

The third period is subsequent the second period. Further, during the third period, the gate line $224_{16}$ is selected for display updating. The sensor electrodes 105 of the row 175 are disposed over (e.g., overlap) the gate line $224_{16}$, and driving the sensor electrodes 105 of the row 175 with the reference signal mitigates interference that is introduced into the display panel 210 during updating, beneficially reducing display artifacts.

As is described above, the capacitive frame 600 at least partially overlaps a first display frame. During the first display frame, the gate lines 224 may be selected according to a first order. For example, during the first display frame, the gate lines 224 are consecutively selected from a first gate line (e.g., the gate line $224_1$) of the gate lines 224 to a last gate line (e.g., the gate line $224_{36}$) of the gate lines 224. However, in other embodiments, other orders may be utilized. For example, the gate line $224_{36}$ is selected first and the gate line $224_1$ is selected last. In other embodiments, the first selected gate lines 224 may be any of the gate lines as long as each gate line 224 is selected during a display frame. The order in which the gate lines 224 are selected may be predetermined. For example, the order in which the gate lines 224 are selected may be determined during design and/or manufacturing of the display panel 210. Further, the order in which the gate lines 224 are selected may be stored, e.g., within the display driver 208.

The order in which the sensor electrodes 105 of the rows 170-181 are driven with a sensing signal (e.g., operated for capacitive sensing) may differ from the order in which the gate lines 224 are selected for display updating. For example, the order in which the sensor electrodes 105 of the rows 170-181 are driven with a sensing signal may be determined to ensure, that at any given time, the sensor electrodes 105 that are driven with a sensing signal are not disposed over (e.g., do not overlap) the gate line 224 selected for display updating. In one embodiment, the order in which the sensor electrodes 105 are selected is non-sequential. For example, the order in which the gate lines 224 are selected is consecutive with reference to a first and second side of an input device (e.g., the input device 100) while the order in which the rows 170-181 of the sensor electrodes 105 are driven with sensing signals is non-consecutive with reference to the first and second side of the input device.

The order in which the rows 170-181 of the sensor electrodes 105 are driven may be determined based on the order in which the gate lines 224 are driven. For example, the order in which the rows 170-181 of the sensor electrodes 105 are driven may be determined such that a row of the sensor electrodes 105 that is driven with the sensing signal does not overlap a gate line 224 selected for display updating.

Each of the rows 170-181 of the sensor electrodes 105 not driven with sensing signals during the first period, the second period, and the third period may be driven during other periods of the capacitive frame 600 such that each row 170-181 is driven during one of the periods. Further, during each period of the capacitive frame 600, the sensor electrodes 105 that overlap a gate line 224 selected for updating the display panel 210 may be driven with the reference signal.

FIG. 7 illustrates rows 770-777 and gate lines 224. The rows 770-777 are configured similar to that of the rows 170-181 of FIG. 2. For example, each of the rows 770-777 comprises one or more of the sensor electrodes 105 similar to that of the rows 170-181 of FIG. 2. Each of the rows 770-777 may be referred to as a portion of the sensor electrodes 105.

As shown in FIG. 7, the rows 770-777 overlap the gate lines 224. For example, row 770 overlaps gate lines 224a, row 771 overlaps gate lines 224b, row 772 overlaps gate lines 224c, and so on.

FIGS. 8A-8B illustrate an exemplary capacitive frame 800 having eight periods. In other embodiments, the capacitive frame 800 may include more than or less than eight periods. The number of periods of the capacitive frame 800 may correspond to the number of rows of sensor electrodes 105. In the following, FIGS. 8A-8B are described with regard to FIGS. 2 and 7.

During each period (e.g., first period-eighth period) of the capacitive frame 800, the sensor electrodes of a first one of the rows 770-777 are driven with a sensing signal, and the sensor electrodes of the row or rows adjacent to the first one are driven with a guarding signal. Further, during each period of the capacitive frame 800, the sensor electrodes of a second one or more of the rows 770-777 are driven with a guarding signal or a reference signal, and the sensor electrodes of a third one or more of the rows 770-777 are driven with the reference signal. The sensor electrodes of the third one or more rows 770-777 overlaps a gate line 224 that is selected for display updating. The sensor electrodes of the rows 770-777 driven with the sensing signal, the guarding signal, and the reference signal may differ from period to period. Further, between at least two sequential periods, the corresponding rows 770-777 that are driven with a sensing signal are non-sequential. For example, as will be described in greater detail in the following, during the sixth period, the sensor electrodes of row 777 are driven with the sensing signal and during the seventh period, the sensor electrodes of row 770 are driven with a sensing signal. Further, between at least two sequential periods, the corresponding rows 770-777 that are driven with a reference signal are sequential. For example, from the first period to the eighth period, the rows 770-777 are sequentially driven with the reference signal.

During a first period of the capacitive frame (e.g., sensing frame) 800, the sensor circuitry 104 drives the sensor electrodes 105 of the row 770 with a reference signal, and the sensor electrodes 105 of the rows 774-777 with a guarding signal or the reference signal. Further, during the first period of the capacitive frame 800, the sensor circuitry 104 drives the sensor electrodes 105 of the rows 771 and 773 with the guarding signal, and the sensor electrodes 105 of the row 772 with the sensing signal. Additionally, during the first period of the capacitive frame 800 and during a first display frame, the gate lines 224a are selected for updating the display panel 210. The gate lines 224a are sequentially selected for updating the display panel 210 during the first period of the capacitive frame 800.

During a second period of the capacitive frame 800, the sensor circuitry 104 drives the sensor electrodes 105 of the row 771 with a reference signal, and the sensor electrodes 105 of the rows 770 and 775-777 with the guarding signal or the reference signal. Further, during the second period of the capacitive frame 800, the sensor circuitry 104 drives the sensor electrodes 105 of the rows 772 and 774 with the guarding signal, and the sensor electrodes 105 of the row 773 with the sensing signal. Additionally, during the second period of the capacitive frame 800 and during the first display frame, the gate lines 224b are selected for updating the display panel 210. The gate lines 224b are sequentially selected for updating the display panel 210 during the second period of the capacitive frame 800.

During a third period of the capacitive frame 800, the sensor circuitry 104 drives the sensor electrodes 105 of the row 772 with a reference signal, and the sensor electrodes 105 of the rows 770-771 and 776-777 with the guarding signal or the reference signal. Further, during the third period of the capacitive frame 800, the sensor circuitry 104 drives the sensor electrodes 105 of the rows 773 and 775 with the guarding signal, and the sensor electrodes 105 of the row 774 with the sensing signal. Additionally, during the third period of the capacitive frame 800 and during the first display frame, the gate lines 224c are selected for updating the display panel 210. The gate lines 224c are sequentially selected for updating the display panel 210 during the third period of the capacitive frame 800.

During a fourth period of the capacitive frame 800, the sensor circuitry 104 drives the sensor electrodes 105 of the row 773 with a reference signal, and the sensor electrodes 105 of the rows 770-773 and 777 with the guarding signal or the reference signal. Further, during the fourth period of the capacitive frame 800, the sensor circuitry 104 drives the sensor electrodes 105 of the rows 774 and 776 with the guarding signal, and the sensor electrodes 105 of the row 775 with the sensing signal. Additionally, during the fourth period of the capacitive frame 800 and during the first display frame, the gate lines 224d are selected for updating the display panel 210. The gate lines 224d are sequentially selected for updating the display panel 210 during the fourth period of the capacitive frame 800.

During a fifth period of the capacitive frame 800, the sensor circuitry 104 drives the sensor electrodes 105 of the row 774 with a reference signal, and the sensor electrodes 105 of the rows 770-773 with the guarding signal or the reference signal. Further, during the fifth period of the capacitive frame 800, the sensor circuitry 104 drives the sensor electrodes 105 of the rows 775 and 777 with the guarding signal, and the sensor electrodes 105 of the row 776 with the sensing signal. Additionally, during the fifth period of the capacitive frame 800 and during the first display frame, the gate lines 224e are selected for updating the display panel 210. The gate lines 224e are sequentially selected for updating the display panel 210 during the fifth period of the capacitive frame 800.

During a sixth period of the capacitive frame 800, the sensor circuitry 104 drives the sensor electrodes 105 of the row 775 with a reference signal, and the sensor electrodes 105 of the rows 770-774 with the guarding signal or the reference signal. Further, during the sixth period of the capacitive frame 800, the sensor circuitry 104 drives the sensor electrodes 105 of the row 776 with the guarding signal, and the sensor electrodes 105 of the row 777 with the sensing signal. Additionally, during the sixth period of the capacitive frame 800 and during the first display frame, the gate lines 224f are selected for updating the display panel 210. The gate lines 224f are sequentially selected for updating the display panel 210 during the sixth period of the capacitive frame 800.

During a seventh period of the capacitive frame 800, the sensor circuitry 104 drives the sensor electrodes 105 of the row 776 with a reference signal, and the sensor electrodes 105 of the rows 772-775 and 777 with the guarding signal or the reference signal. Further, during the seventh period of the capacitive frame 800, the sensor circuitry 104 drives the sensor electrodes 105 of the row 771 with the guarding signal, and the sensor electrodes 105 of the row 770 with the sensing signal. Additionally, during the seventh period of the capacitive frame 800 and during the first display frame, the gate lines 224g are selected for updating the display panel 210. The gate lines 224g are sequentially selected for updating the display panel 210 during the seventh period of the capacitive frame 800.

During an eighth period of the capacitive frame 800, the sensor circuitry 104 drives the sensor electrodes 105 of the row 777 with a reference signal, and the sensor electrodes 105 of the rows 773-776 with the guarding signal or the reference signal. Further, during the eighth period of the capacitive frame 800, the sensor circuitry 104 drives the sensor electrodes 105 of the row 770 and 772 with the guarding signal, and the sensor electrodes 105 of the row 771 with the sensing signal. Additionally, during the eighth period of the capacitive frame 800 and during the first display frame, the gate lines 224h are selected for updating the display panel 210. The gate lines 224h are sequentially selected for updating the display panel 210 during the eighth period of the capacitive frame 800.

In the embodiment of FIGS. 8A and 8B, the capacitive frame rate and the display frame rate are the same. Accordingly, during the capacitive frame 800 and the corresponding display frame, all of the sensor electrodes are operated for input sensing (e.g., driven with a sensing signal) and the display panel 210 is updated. In other embodiments, the capacitive frame rate may be greater than the display frame rate. For example, as will be described with regard to FIGS. 9A1, 9A2, 9B1, and 9B2, at least a portion of each of the capacitive frames 910 and 920 occur during a common display frame. The embodiment of FIGS. 9A1, 9A2, 9B1, and 9B2 are described with regard to FIGS. 2 and 7.

As is described with regard to the capacitive frame 800 of FIGS. 8A and 8B, during each period (e.g., first period-eighth period) of the capacitive frame 910 or 920, the sensor electrodes of a first one of the rows 770-777 are driven with a sensing signal, and the sensor electrodes of the row or rows adjacent to the first one are driven with a guarding signal. Further, during each period of the capacitive frame 910 or 920, the sensor electrodes of a second one or more of the rows 770-777 are driven with a guarding signal or a reference signal, and the sensor electrodes of a third one or more of the rows 770-777 are driven with the reference signal. The sensor electrodes of the third one or more rows 770-777 overlaps a gate line 224 that is selected for display updating.

As is described above with regard to FIGS. 8A and 8B, the sensor electrodes of the rows 770-777 driven with the sensing signal and the guarding signal differ from period to period. Further, between at least two sequential periods, the corresponding rows 770-777 that are driven with a sensing signal are non-sequential. For example, as will be described in greater detail in the following, during the sixth period, the row 777 is driven with the sensing signal and during the seventh period, the row 770 is driven with a sensing signal. The capacitive frame 910 and/or 920 differs from that of the capacitive frame 800 in that during at least two sequential periods of the capacitive frames 910 and 920, the sensor electrodes of the same row is driven with the reference signal. For example, during the first period and the second period of the capacitive frame 910, the sensor electrodes of the row 771 are driven with the reference signal. Further, between two other sequential periods, sensor electrodes of sequential rows are driven with the reference signal. For example, during the second period of the capacitive frame 910, the sensor electrodes of the row 771 are driven with the reference signal, and during the third period of the capacitive frame 910, the sensor electrodes of the row 772 are driven with reference signal.

During a first period of the capacitive frame (e.g., sensing frame) 910, the sensor circuitry 104 drives the sensor electrodes 105 of the row 771 with a reference signal, and the sensor electrodes 105 of the rows 770 and 775-777 with the guarding signal or the reference signal. Further, during the first period of the capacitive frame 910, the sensor circuitry 104 drives the sensor electrodes 105 of the rows 772 and 774 with the guarding signal, and the sensor electrodes 105 of the row 773 with the sensing signal. Additionally, during the first period of the capacitive frame 910 and during a first display frame, a first one or more of the gate lines 224b are sequentially selected for updating the display panel 210.

During a second period of the capacitive frame 910, the sensor circuitry 104 drives the sensor electrodes 105 of the row 771 with a reference signal, and the sensor electrodes 105 of the rows 770, 772, and 776-777 with the guarding signal or the reference signal. Further, during the second period of the capacitive frame 910, the sensor circuitry 104 drives the sensor electrodes 105 of the rows 773 and 775 with the guarding signal, and the sensor electrodes 105 of the row 774 with the sensing signal. Additionally, during the second period of the capacitive frame 910 and during the first display frame, a second one or more of the gate lines 224b are sequentially selected for updating the display panel 210.

During a third period of the capacitive frame 910, the sensor circuitry 104 drives the sensor electrodes 105 of the row 772 with a reference signal, and the sensor electrodes 105 of the rows 770-771, 773, and 777 with the guarding signal or the reference signal. Further, during the third period of the capacitive frame 910, the sensor circuitry 104 drives the sensor electrodes 105 of the rows 774 and 776 with the guarding signal, and the sensor electrodes 105 of the row 775 with the sensing signal. Additionally, during the third period of the capacitive frame 910 and during the first display frame, a first one or more of the gate lines 224c are sequentially selected for updating the display panel 210.

During a fourth period of the capacitive frame 910, the sensor circuitry 104 drives the sensor electrodes 105 of the row 772 with a reference signal, and the sensor electrodes 105 of the rows 770-771 and 773-774 with the guarding signal or the reference signal. Further, during the fourth period of the capacitive frame 910, the sensor circuitry 104 drives the sensor electrodes 105 of the rows 775 and 777 with the guarding signal, and the sensor electrodes 105 of the row 776 with the sensing signal. Additionally, during the fourth period of the capacitive frame 910 and during the first display frame, a second one or more of the gate lines 224c are sequentially selected for updating the display panel 210.

During a fifth period of the capacitive frame 910, the sensor circuitry 104 drives the sensor electrodes 105 of the row 773 with a reference signal, and the sensor electrodes 105 of the rows 770-772 and 774-775 with the guarding signal or the reference signal. Further, during the fifth period of the capacitive frame 910, the sensor circuitry 104 drives the sensor electrodes 105 of the row 776 with the guarding signal, and the sensor electrodes 105 of the row 777 with the sensing signal. Additionally, during the fifth period of the capacitive frame 910 and during the first display frame, a first one or more of the gate lines 224d are sequentially selected for updating the display panel 210.

During a sixth period of the capacitive frame 910, the sensor circuitry 104 drives the sensor electrodes 105 of the row 773 with a reference signal, and the sensor electrodes 105 of the rows 772, and 774-777 with the guarding signal or the reference signal. Further, during the sixth period of the capacitive frame 910, the sensor circuitry 104 drives the sensor electrodes 105 of the row 771 with the guarding signal, and the sensor electrodes 105 of the row 770 with the sensing signal. Additionally, during the sixth period of the capacitive frame 910 and during the first display frame, a second one or more of the gate lines 224d are sequentially selected for updating the display panel 210.

During a seventh period of the capacitive frame 910, the sensor circuitry 104 drives the sensor electrodes 105 of the row 774 with a reference signal, and the sensor electrodes 105 of the rows 773 and 775-777 with the guarding signal or the reference signal. Further, during the seventh period of the capacitive frame 910, the sensor circuitry 104 drives the sensor electrodes 105 of the rows 770 and 772 with the guarding signal, and the sensor electrodes 105 of the row 771 with the sensing signal. Additionally, during the seventh period of the capacitive frame 910 and during the first display frame, a first one or more of the gate lines 224e are sequentially selected for updating the display panel 210.

During an eighth period of the capacitive frame 910, the sensor circuitry 104 drives the sensor electrodes 105 of the row 774 with a reference signal, and the sensor electrodes 105 of the rows 770 and 775-777 with the guarding signal or the reference signal. Further, during the eighth period of the capacitive frame 910, the sensor circuitry 104 drives the sensor electrodes 105 of the row 771 and 773 with the guarding signal, and the sensor electrodes 105 of the row 772 with the sensing signal. Additionally, during the eighth period of the capacitive frame 910 and during the first display frame, a second one or more of the gate lines 224e are sequentially selected for updating the display panel 210.

The capacitive frame (e.g., sensing frame) 920 begins after the completion of the capacitive frame 910. Further, at least a portion of the capacitive frame 920 overlaps the same display frame overlapped by the capacitive frame 910. As will be described in greater detail in the following, the first period through sixth periods of the capacitive frame 920 overlap with (e.g., occur during) the first display frame and the seventh and eighth periods of the capacitive frame 920 overlap with (e.g., occur during) a second display frame. The second display frame is subsequent to the first display frame.

During a first period of the capacitive frame 920, the sensor circuitry 104 drives the sensor electrodes 105 of the row 775 with a reference signal, and the sensor electrodes 105 of the rows 770-774 with the guarding signal or the reference signal. Further, during the first period of the capacitive frame 920, the sensor circuitry 104 drives the sensor electrodes 105 of the row 776 with the guarding signal, and the sensor electrodes 105 of the row 777 with the sensing signal. Additionally, during the first period of the capacitive frame 920 and during the first display frame, a first one or more of the gate lines 224f are sequentially selected for updating the display panel 210.

During a second period of the capacitive frame 920, the sensor circuitry 104 drives the sensor electrodes 105 of the row 775 with a reference signal, and the sensor electrodes 105 of the rows 772-774 and 776-777 with the guarding signal or the reference signal. Further, during the second period of the capacitive frame 920, the sensor circuitry 104 drives the sensor electrodes 105 of the row 771 with the guarding signal, and the sensor electrodes 105 of the row 770 with the sensing signal. Additionally, during the second period of the capacitive frame 920 and during the first display frame, a second one or more the gate lines 224f are sequentially selected for updating the display panel 210.

During a third period of the capacitive frame 920, the sensor circuitry 104 drives the sensor electrodes 105 of the row 776 with a reference signal, and the sensor electrodes 105 of the rows 773-775 and 777 with the guarding signal or the reference signal. Further, during the third period of the capacitive frame 920, the sensor circuitry 104 drives the sensor electrodes 105 of the rows 770 and 772 with the guarding signal, and the sensor electrodes 105 of the row 771 with the sensing signal. Additionally, during the third period of the capacitive frame 920 and during the second display frame, a first or more of the gate lines 224g are sequentially selected for updating the display panel 210.

During a fourth period of the capacitive frame 920, the sensor circuitry 104 drives the sensor electrodes 105 of the row 776 with a reference signal, and the sensor electrodes 105 of the rows 770, 774-775, and 777 with the guarding signal or the reference signal. Further, during the fourth period of the capacitive frame 920, the sensor circuitry 104 drives the sensor electrodes 105 of the rows 771 and 773 with the guarding signal, and the sensor electrodes 105 of the row 772 with the sensing signal. Additionally, during the fourth period of the capacitive frame 920 and during the first display frame, a second one or more of the gate lines 224g are sequentially selected for updating the display panel 210.

During a fifth period of the capacitive frame 920, the sensor circuitry 104 drives the sensor electrodes 105 of the row 777 with a reference signal, and the sensor electrodes 105 of the rows 770-772 and 775-776 with the guarding signal or the reference signal. Further, during the fifth period of the capacitive frame 920, the sensor circuitry 104 drives the sensor electrodes 105 of the rows 772 and 774 with the guarding signal, and the sensor electrodes 105 of the row 773 with the sensing signal. Additionally, during the fifth period of the capacitive frame 920 and during the first display frame, a first one or more of the gate lines 224h are sequentially selected for updating the display panel 210

During a sixth period of the capacitive frame 920, the sensor circuitry 104 drives the sensor electrodes 105 of the row 777 with a reference signal, and the sensor electrodes 105 of the rows 770-772 and 776 with the guarding signal or the reference signal. Further, during the sixth period of the capacitive frame 920, the sensor circuitry 104 drives the sensor electrodes 105 of the rows 773 and 775 with the guarding signal, and the sensor electrodes 105 of the row 774 with the sensing signal. Additionally, during the sixth period of the capacitive frame 920 and during the first display frame, a second one or more of the gate lines 224h are sequentially selected for updating the display panel 210.

During a seventh period of the capacitive frame 920, the sensor circuitry 104 drives the sensor electrodes 105 of the row 770 with a reference signal, and the sensor electrodes 105 of the rows 771-773 and 777 with the guarding signal or the reference signal. Further, during the seventh period of the capacitive frame 920, the sensor circuitry 104 drives the sensor electrodes 105 of the rows 774 and 776 with the guarding signal, and the sensor electrodes 105 of the row 775 with the sensing signal. Additionally, during the seventh period of the capacitive frame 920 and during a second display frame, a first one or more of the gate lines 224a are sequentially selected for updating the display panel 210. The second display frame is subsequent to the first display frame.

During an eighth period of the capacitive frame 920, the sensor circuitry 104 drives the sensor electrodes 105 of the row 770 with a reference signal, and the sensor electrodes 105 of the rows 771-774 with the guarding signal or the reference signal. Further, during the eighth period of the capacitive frame 920, the sensor circuitry 104 drives the sensor electrodes 105 of the row 775 and 777 with the guarding signal, and the sensor electrodes 105 of the row 776 with the sensing signal. Additionally, during the eighth period of the capacitive frame 910 and during the second display frame, a second one or more of the gate lines 224a are sequentially selected for updating the display panel 210.

In the embodiment of FIGS. 9A1, 9A2, 9B1, and 9B2, the order in which the rows 770-777 are driven with the sensing signal differs between the capacitive frame 910 and 920. Further, the order in which the rows 770-777 are driven with the reference signal and/or the guarding signal differs between the capacitive frame 910 and 920. As illustrated in FIGS. 9A1, 9A2, 9B1, and 9B2, the order in which the rows 770-777 are driven is non-sequential.

While during each period of the capacitive frames 800, 910, and 920, one row (e.g., 770-777) of sensor electrodes 105 is driven with a reference signal, in other embodiments, during one or more periods of the capacitive frames 800, 910, and 920, two or more rows (e.g., 770-777) of sensor electrodes 105 are driven with a reference signal. The two or more rows of sensor electrodes 105 are sequentially driven with the reference signal during a common period of a capacitive frame (e.g., the capacitive frames 800, 910, and 920). Such an embodiment may be utilized in periods of a capacitive frame where gate lines 224 overlapped by two different rows of sensor electrodes 105 are selected for updating the display panel 210. For example, during a period when one or more of the gate lines 224a and 224b are selected to update the display panel 210, the sensor electrodes 105 of the rows 770 and 771 are driven with the reference signal. Further, while in the embodiment of FIGS. 9A1, 9A2, 9B1, and 9B2, two capacitive frames occur during (e.g., overlap) a common display frame, in other embodiments, more than two capacitive frames may occur during a common display frame. As the number of capacitive frames that occur during a display frame increases, the capacitive frame rate increases as compared to the display frame. Further, the rows 770-777 may be driven in different orders as depicted in FIGS. 8 and 9, as long as the row driven with the reference signal overlaps the gate line 224 selected for updating.

The capacitive frames 910 and 920 may be utilized as corresponding capacitive frame types, and repeated while updating the display panel 210. For example, each of the capacitive frames 910 and 920 may occur multiple times while the display panel 210 is updated.

Figure 10:
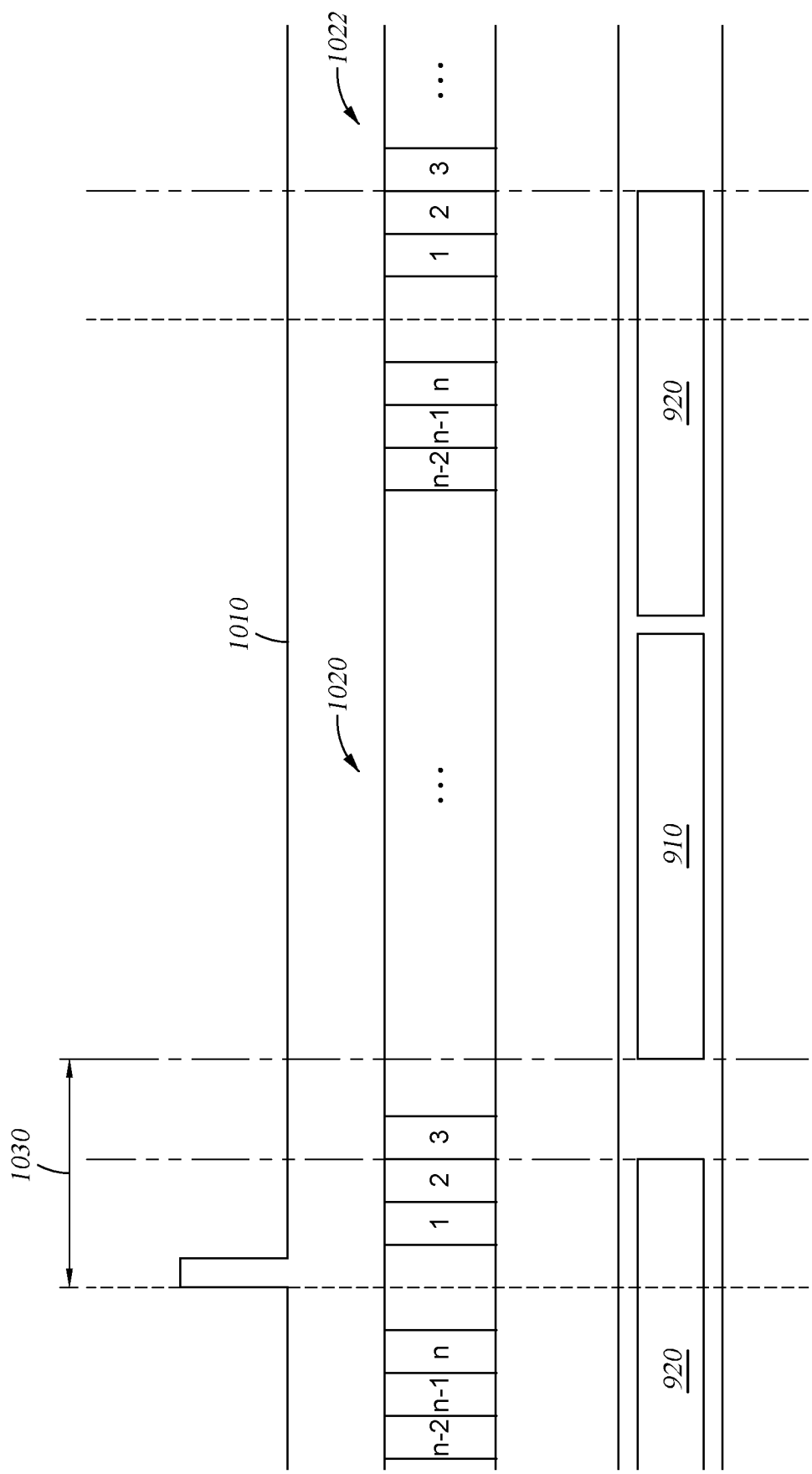
FIG. 10 is a timing diagram for performing display updating and input sensing, according to one or more embodiments.

FIG. 10 is an example timing diagram illustrating an embodiment where the capacitive frame rate (e.g., sensing frame rate or capacitive sensing frame rate) is higher than the display frame rate. For example, the capacitive frames 910 and 920 occur during the display frame 1020. Further, FIG. 10 illustrates multiple instances of the capacitive frame 920. As illustrated, an instance of the capacitive frame 920 occurs during the display frames 1020 and 1022. In such an instance, the capacitive frame 920 may be referred to as straddling the display frames 1020 and 1022. During each display frame 1020 and 1022, gate lines (e.g., the gate lines 224 of FIG. 2) are driven in an order from gate line 1 to gate line N, where N is greater than 1.

The display control signal 1010 is utilized to initiate updating of a display frame. The display control signal 1010 may be a vertical sync (or Vsync) signal. With additional reference to FIG. 2, the display control signal 1010 is utilized by the display driver 208 to initiate updating of the display panel 210. A display frame is started (e.g., initiated) based on the Vsync signal. For example, in response to a rising or falling edge of the display control signal 1010, a control signal is communicated from the display driver 208 to the gate selection circuitry 230 to initiate selection of the gate lines 224. Further, the display driver 208 initiates driving display update signals onto the data lines 222 based on the rising or falling edge of the display control signal 1010. The display control signal 1010 is communicated from the display driver 208 to the sensor circuitry 104 to start (e.g., initiate) input sensing (e.g., driving sensing signal) with the sensor electrodes 105 during capacitive frames. A delay 1030 is inserted from the rising or falling edge of the display control signal 1010 to the beginning of the capacitive frame 910. The delay 1030 is utilized to align the timing of the capacitive frames 910 and 920 with the selection of the gate lines 224 of the display frames 1020 and 1022. Further, during the delay 1030, the sensor circuitry 104 is prepared to drive the sensor electrodes 105 with sensing signals. Delaying the start of the capacitive frame 910 by delay 1030 beneficially improves the timing of driving the sensor electrodes 105 during the capacitive frames 910 and 920 with reference to the timing of selecting the gate lines (e.g., the gate lines 224 of FIG. 2) for display updating, mitigating display artifacts. Further, in one or more embodiments, delaying the start of the capacitive frame 910 by delay 1030, allows for a capacitive frame 920 to overlap multiple display frames (e.g., the display frames 1020 and 1022), further mitigating interference generated by driving the sensor electrodes 105 for capacitive sensing.

While in the embodiment of FIG. 10, the capacitive frame 920 spans multiple display frames, e.g., the display frames 1020 and 1022, in other embodiments, both of the capacitive frames 910 and 920 may start and end within a single display frame (e.g., the display frame 1020). Further, the capacitive frame 920 may overlap different portions of the display frames 1020 and 1022 than that illustrated in FIG. 10.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A processing system for an input device, the processing system comprising:
sensor circuitry configured to operate sensor electrodes for input sensing during a first sensing frame, wherein during a first period of the first sensing frame in which input sensing and display updating are occurring simultaneously, the sensor circuitry is configured to:
drive a first portion of the sensor electrodes with a sensing signal, wherein the first portion of the sensor electrodes overlaps with one or more gate lines of a display panel that are not selected for display updating during the first period in which input sensing and display updating are occurring simultaneously;
drive a second portion of the sensor electrodes with a guarding signal, wherein the guarding signal and the sensing signal have at least one of amplitude, phase or frequency in common; and
drive a third portion of the sensor electrodes with a reference signal, wherein the third portion of the sensor electrodes overlaps with one or more gate lines of the display panel selected for display updating during the first period in which input sensing and display updating are occurring simultaneously.

2. The processing system of claim 1, wherein the second portion is between the first portion and the third portion.

3. The processing system of claim 1, wherein during a second period of the first sensing frame, the sensor circuitry is configured to:
drive the first portion and the third portion with the guarding signal;
drive the second portion with the reference signal, wherein the second portion overlaps with one or more gate lines of the display panel selected for display updating during the second period, and wherein the second period is subsequent to the first period; and
drive a fourth portion of the sensor electrodes with the sensing signal.

4. The processing system of claim 3, wherein during a third period of the first sensing frame, the sensor circuitry is further configured to:
drive the first portion with the reference signal, wherein the first portion overlaps with one or more gate lines of the display panel selected for display updating during the third period, and wherein the third period is subsequent to the second period;
drive the second portion with the sensing signal; and
drive the third portion and the fourth portion with the guarding signal.

5. The processing system of claim 1, wherein the sensor electrodes are operated for input sensing during the first sensing frame according to a first order, and the sensor electrodes are operated for input sensing during a second sensing frame according to a second order, wherein the first order differs from the second order.

6. The processing system of claim 5, wherein the first sensing frame occurs during a first display frame, and the second sensing frame occurs during the first display frame and a second display frame, and wherein during the first display frame and the second display frame the display panel is updated.

7. The processing system of claim 6, wherein gate lines of the display panel are sequentially selected for display updating during the first display frame, and wherein the first order is non-sequential.

8. The processing system of claim 5, wherein the first sensing frame occurs during a first display frame, the second sensing frame occurs during the first display frame, and a third sensing frame occurs during the first display frame and a second display frame, and wherein during the first display frame and the second display frame the display panel is updated.

9. The processing system of claim 1, wherein the sensor circuitry is further configured to initiate driving the first sensing frame based on a display update signal indicating a start of a display frame, wherein a start of the first sensing frame is delayed from the start of the display frame.

10. An input device, comprising:
sensor electrodes; and
a processing system coupled to the sensor electrodes and configured to operate the sensor electrodes for input sensing during a first sensing frame, wherein during a first period of the first sensing frame in which input sensing and display updating are occurring simultaneously, the processing system is configured to:
drive a first portion of the sensor electrodes with a sensing signal, wherein the first portion of the sensor electrodes overlaps with one or more gate lines of a display panel that are not selected for display updating during the first period in which input sensing and display updating are occurring simultaneously;
drive a second portion of the sensor electrodes with a guarding signal, wherein the guarding signal and the sensing signal have at least one of amplitude, phase or frequency in common; and
drive a third portion of the sensor electrodes with a reference signal, wherein the third portion of the sensor electrodes overlaps with one or more gate lines of the display panel selected for display updating during the first period in which input sensing and display updating are occurring simultaneously.

11. The input device of claim 10, wherein, during a second period of the first sensing frame, the processing system is configured to:
drive the first portion and the third portion with the guarding signal;
drive the second portion with the reference signal, wherein the second portion overlaps with one or more gate lines of the display panel selected for display updating during the second period, and wherein the second period is subsequent to the first period; and
drive a fourth portion of the sensor electrodes with the sensing signal.

12. The input device of claim 11, wherein, during a third period of the first sensing frame, the processing system is configured to:
drive the first portion with the reference signal, wherein the first portion overlaps with one or more gate lines of the display panel selected for display updating during the third period, and wherein the third period is subsequent to the second period;
drive the second portion with the sensing signal; and
drive the third portion and the fourth portion with the guarding signal.

13. The input device of claim 10, wherein the processing system is configured to operate the sensor electrodes for input sensing during the first sensing frame according to a first order, and to operate the sensor electrodes for input sensing during a second sensing frame according to a second order, wherein the first order differs from the second order.

14. The input device of claim 13, wherein the first sensing frame occurs during a first display frame of a plurality of display frames, and the second sensing frame occurs during the first display frame and a second display frame of the plurality of display frames, and wherein during the first display frame and the second display frame the display panel is updated.

15. The input device of claim 10, wherein the processing system is further configured to initiate driving the first sensing frame based on a display update signal indicating a start of a display frame, wherein a start of the first sensing frame is delayed from the start of the display frame.

16. A method, comprising:
    driving, by a processing system, during a first period of a first sensing frame in which input sensing and display updating are occurring simultaneously, a first portion of sensor electrodes with a sensing signal, wherein the first portion of the sensor electrodes overlaps with one or more gate lines of a display panel that are not selected for display updating during the first period in which input sensing and display updating are occurring simultaneously;
    driving, by the processing system, during the first period, a second portion of the sensor electrodes with a guarding signal, wherein the guarding signal and the sensing signal have at least one of amplitude, phase or frequency in common; and
    driving, by the processing system, during the first period, a third portion of the sensor electrodes with a reference signal, wherein the third portion of the sensor electrodes overlaps with one or more gate lines of the display panel selected for display updating during the first period in which input sensing and display updating are occurring simultaneously.

17. The method of claim 16, further comprising:
    driving, during a second period of the first sensing frame, the first portion and the third portion with the guarding signal;
    driving, during the second period, the second portion with the reference signal, wherein the second portion overlaps with one or more gate lines of the display panel selected for display updating during the second period, and wherein the second period is subsequent to the first period; and
    driving, during the second period, a fourth portion of the sensor electrodes with the sensing signal.

18. The method of claim 17, further comprising:
    driving, during a third period of the first sensing frame, the first portion with the reference signal, wherein the first portion overlaps with one or more gate lines of the display panel selected for display updating during the third period, and wherein the third period is subsequent to the second period;
    driving, during the third period, the second portion with the sensing signal; and
    driving, during the third period, the third portion and the fourth portion with the guarding signal.

19. The method of claim 16, wherein the sensor electrodes are operated for input sensing during the first sensing frame according to a first order, and the sensor electrodes are operated for input sensing during a second sensing frame according to a second order, wherein the first order differs from the second order.

20. The method of claim 16, wherein a start of the first sensing frame is delayed from a start of a display frame during which the display panel is updated.

* * * * *